United States Patent [19]
Kilgore

[11] 3,933,444
[45] Jan. 20, 1976

[54] FLASH BACK ARRESTOR

[75] Inventor: Charles Ray Kilgore, Rocky River, Ohio

[73] Assignee: Emerson Electric Co., St. Louis, Mo.

[22] Filed: Apr. 29, 1974

[21] Appl. No.: 465,250

[52] U.S. Cl. .................... 48/192; 48/190; 48/191; 137/465; 222/189; 431/22
[51] Int. Cl.² .......................................... F17D 3/00
[58] Field of Search ........ 48/192, 191, 190; 431/22; 222/189; 137/465

[56] References Cited
UNITED STATES PATENTS
3,689,239   9/1972   Eriksson .............................. 48/192

FOREIGN PATENTS OR APPLICATIONS
101,840    8/1937   Australia .............................. 431/22

Primary Examiner—Robert L. Lindsay, Jr.
Assistant Examiner—George C. Yeung
Attorney, Agent, or Firm—Meyer, Tilberry & Body

[57] ABSTRACT

A flash back arrestor for use in gas supply lines. The arrestor includes an elongated passageway through which the gases flow in one direction and through which the flash back must pass in the reverse direction. A pressure-actuated valve at the inlet end of the passageway is actuated by pressures from the flash back at the discharge end of the passageway. The valve consists of a valve member in the form of a piston freely movable under the influence of flash back pressures against a valve seat at the inlet to the passageway. The valve member carries a locking arrangement which moves under the influence of the flash back to latch the valve member with a biasing force to the closed position after a flash back occurs. Additionally, a second valve is provided actuated by the flash back to vent the flash back to the atmosphere. A separate flow actuated check valve prevents backflow to the gas supply tank in the event the flow direction should reverse, not caused by a flash back.

16 Claims, 3 Drawing Figures

U.S. Patent  Jan. 20, 1976  3,933,444
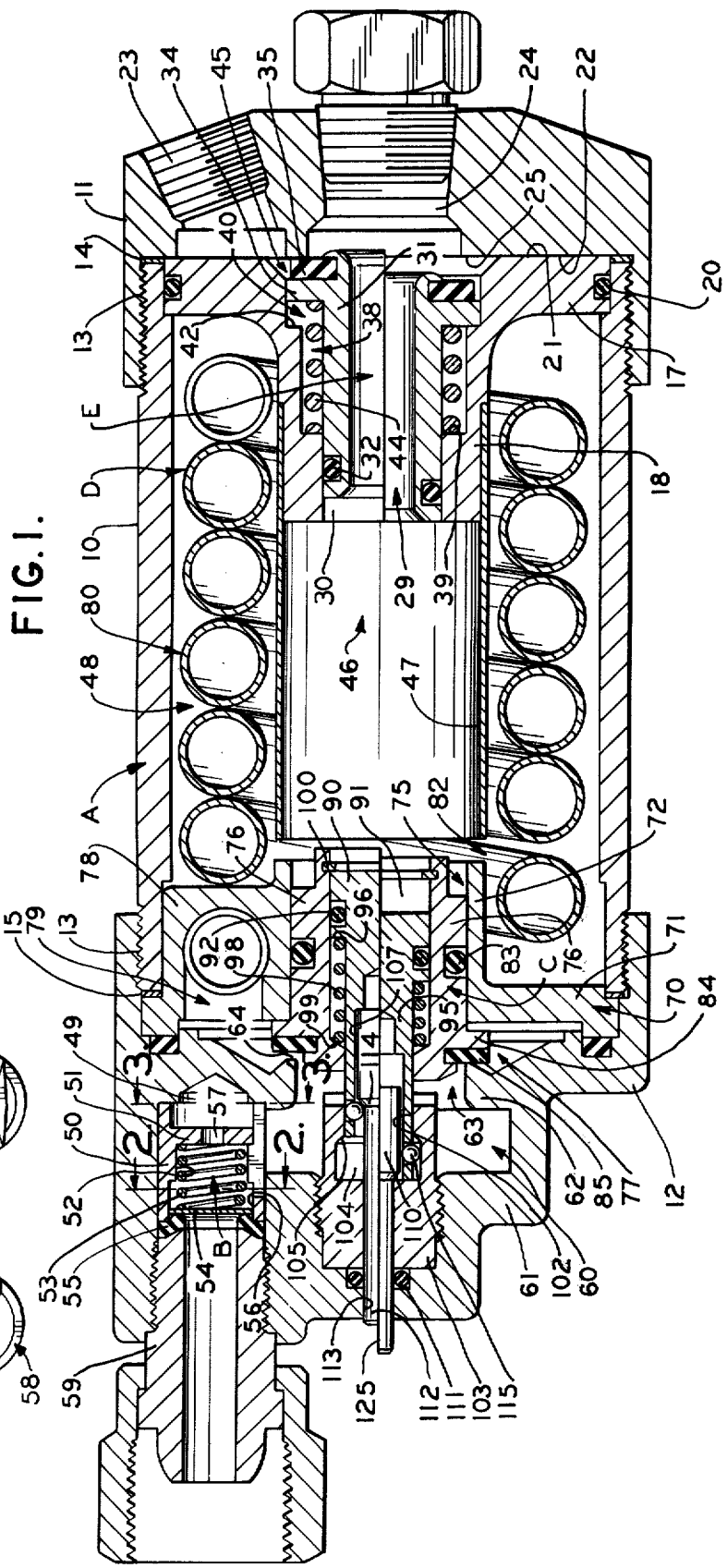

FLASH BACK ARRESTOR

This invention pertains to the art of flash back arrestors for use in a gas supply line.

The invention is particularly suited for use in connection with the supply lines for oxy-acetylene torches and will be described with particular reference thereto, although it will be appreciated that the invention has broader Applications and may be used in any gas supply pipe or hose wherein it is desired to stop the travel of a flash back.

It is well known that serious and costly explosions may sometimes occur when operating oxy-acetylene torches should the burning gases at the tip of the torch backfire into the gas supply lines. In such instances, the back fire creates a high pressure wave in the hose which rapidly travels down the supply line against the onflowing gas. Sometimes back to the supply tank in which instance it may cause a serious explosion.

Various means have been proposed in the past to prevent such flash backs from traveling back to the gas supply source. Typical patents illustrating such apparatus are as follows: U.S. Pat. Nos. 2,609,281 issued Sept. 2, 1952 to E. H. Smith; 2,252,905 issued Aug. 19, 1941 to H. Windlin; 2,255,135 issued Sept. 9, 1941 to M. Tornow; and 2,490,175 issued Dec. 6, 1949 to O. Thurman. U.S. Pat. No. 1,817,148 issued Aug. 4, 1931 to A. P. Hornor describes a flash arrestor for surgical purposes.

Such apparatus normally includes an elongated passageway with a normally open valve at one end which is moved to its closed position by pressures at the outlet end of the passageway. The valve usually included a diaphram against which the flash back pressures operate and the valve for stopping the movement of the flash must move against the bias of a spring or of the diaphram in order to be closed. Furthermore, in a number of instances, no means were provided for locking the valve in the closed position once a flash back had occurred. Also there was no means for venting of the flash back to the atmosphere resulting in the possible development of excessively high pressures in the supply hoses and the rupture thereof.

A further difficulty is that such devices have been unduly complicated and unduly bulky. This partly results from the fact that the valve requires an appreciable length of time to move to the closed position. To allow for this time, the length of the passageway had to be unduly long which added to the bulk.

THE INVENTION

The present invention contemplates a flash back arrestor which overcomes all of the difficulties of the prior art, has a minimum of bulk, is safe and positive in operation, latches the safety valve in the closed position when a flash back does occur, gives an indication to the operator that a flash back has occured, and is easily reset.

In accordance with the present invention, a flash back arresting device for gas supply lines is provided of the type having an elongated passage between the inlet and outlet and a valve at the inlet of the passage actuated by high pressures which might occur at the outlet of the passage, the valve being in the form of a piston exposed at one surface to the flash back pressures and freely slidable from a first normally open valve position to a second valve closed position in combination with means on the piston for latching the piston in the second position.

Further in accordance with the invention, the means include a locking plunger having a surface exposed to the flash back pressures which moves from a retracted first position to a second extended position where it is locked and biases the valve member to the closed position.

Further in accordance with the invention, the locking plunger has a latching pin therein which when released by movement of the locking plunger can move to the latching position and once in a latching position prevents opening of the valve until the latching pin is manually returned to its unlatched position.

Further in accordance with the invention, the device includes a passage to the atmosphere closed by a valve member, preferably at the outlet end, actuated by flash back pressures to vent such flash back pressures to the atmosphere.

In all instances, the elongated passage must be of a length such that considering the velocity of propagation of the flash, the valve communicating the inlet of the passage to the supply tank will have time to close before the flash traveling through the passage reaches such valve.

OBJECTS

The principal object of the invention is a provision of a new and improved flash back arrestor which is relatively small in bulk, positive in operation and which when a flash back occurs will close a valve to the fuel supply tank before the flash back can reach the valve and will also prevent flow of gas from the tank out of the outlet of the device should the hoses be ruptured or the operator injured and otherwise unable to stop the flow of gas.

Another object of the invention is the provision of a new and improved flash back arrestor wherein the valve member can freely move to the closed position without working against the bias of a spring or otherwise.

A further object of the invention is the provision of a new and improved flash back arrestor wherein the valve member may freely move to the closed position without the impediment of the force or bias of a spring or otherwise and yet will be biased to the closed position by a releasable latching means.

A further object of the invention is the provision of a new and improved flash back arrestor wherein the flash back pressures must flow through the valve member of a valve which member can move to vent the inside of the device to the atmosphere.

A further object of the invention is the provision of a new and improved flash back arrestor having a one way flow control valve at the inlet, an elongated passage communicating the flow valve to the outlet, a pressure actuated flow control valve at the inlet of the passage actuated by high pressures which might occur at the outlet of the passageway and a third valve communicating the outlet of the device to the atmosphere when flash back pressures exist.

The invention may take form in certain parts and arrangements of parts, a preferred embodiment of which will be described in detail in this specification and illustrated in the accompanying drawing which forms a part hereof and wherein:

FIG. 1 is a cross-sectional view of a flash back arrestor showing the arrangements of the parts; the upper half showing the valve in the normal position and the lower half in the actuated position.

FIG. 2 is a cross-sectional view taken through the line 2—2 of FIG. 1; and,

FIG. 3 is a partial cross-sectional view taken on the line 3—3 of FIG. 1.

Referring now to the drawings, wherein the showings are for the purposes of illustrating a preferred embodiment of the invention only and not for the purposes of limiting same, FIG. 1 shows a housing A having on the inside thereof a flow controlled check valve B, a flash back pressure actuated valve C, an elongated passageway D leading from the valve C to the inside of the housing A and a flash back pressure release valve E.

The housing A may take any one of a number of different forms, but in the embodiment shown is comprised generally of a sleeve 10 having mounted on the righthand or discharge end an end cap 11 and at the left or inlet end an end cap 12. These caps may be fixed relative to the sleeve in any desired way, but in the embodiment shown the ends of the sleeve 10 are threaded into bores in the ends of the caps 11, 12 as at 13.

Sealing means 14, 15 are provided at the right and lefthand ends of the sleeve 10.

An insert member made up of a flange 17 and a cylindrical sleeve 18 is positioned in the righthand end of the sleeve 10. The outer diameter of the flange 17 fits into a small counterbore in the righthand end of the sleeve 10. An O-ring 20 in a groove in the periphery of the flange 17 provides a gas-tight seal. The righthand end of flange 17 has a flat surface 21 which abutts against a flat surface 22 on end cap 11.

End cap 11 is provided with a vent opening 23 which may be threaded as shown through surface 22 and an outlet opening 24 generally on the axis of the sleeve 10 which also opens through surface 22 spaced from the opening of opening 23 through the surface 22. Surface 22 surrounding opening 24 through surface 22 forms a valve seat 25 as will appear.

Cylindrical sleeve 18 has an axial passage or cylinder bore 30 extending therethrough generally aligned with opening 24 and a valve member 31 is slidably supported in this bore 30.

Valve member 31 is in the shape of a sleeve having an internal passage 29 and an outer diameter such as to slide in cylinder bore 30 and has a groove in its outer surface in which an O-ring 32 is mounted in sliding sealing engagement with cylinder bore 30. Valve member 31 also has a flange 34 on its righthand end against which a valve gasket 35 is mounted.

The cylinder bore 30 is counter bored from the righthand end to provide a space 38 externally of valve member 31 and a shoulder 39. This counterbore is further counter bored on the righthand end to provide a space 40 for flange 34 and a shoulder 42 which limits movement of the valve member 31 to the left. A compression spring 44 bearing against shoulder 39 biases valve member 31 to the right and valve gasket 35 against valve seat 25. Surface 21 adjacent passage 23 is cut away to provide a passage 45 from the inside of the housing A to the passage 23 when the valve member 31 is moved to the left against the bias of spring 44.

Space 40 is vented to atmosphere through any clearance which may exist between the outer surface of flange 34 and the cylindrical surface surrounding the space 40 and passage 45. It is to be further noted that the inner diameter of valve seat 25 is greater than the diameter of cylinder bore 30 so that any forces developed by gas pressures on the righthand end of valve member 31 will be slightly in excess of the forces developed by gas pressures on the lefthand end, which would normally tend to move valve member 31 to the left and open valve E. The bias of spring 44 overcomes any force differentials developed at the normal operating pressures of the device. However, in the event of excessive pressures, such as would be caused by a flash back, the force differential would move valve member 31 to the left communicating passage 24 to passage 23 through passage 45. This excessive pressure would immediately be vented to atmosphere.

Passage 29 communicates passage 24 to the inside passage 46 of a sleeve 47 mounted on the outside of sleeve 18 and extending a distance to the left of the passage 29 through valve member 31.

This sleeve 47 is radially spaced from the inner surface of housing sleeve 10 to provide a space 48.

The lefthand end cap 12 is the inlet side of the device and has an axially extending passage 49 offset from the axis of the housing in which check valve B is positioned. Check valve B is important to the overall operation of the device, but its specific construction forms no part of the present invention. In general, check valve B includes a housing 50 generally in the shape of a sleeve having a base 51 with a gas passage 57 therethrough. The sleeve has a bore 52 in which a compression spring 53 is positioned and a counter bore 56 in which valve member 54 in the shape of a flat plate moves. Compression spring 53 biases valve member 54 against a nonmetallic valve seat 55 held in position by a stem 59 threaded into the passage 49 in the lefthand end of cap 12. The walls of the sleeve 50 are cut away as at 58 to form passages for gas entering from the lefthand side of the device into an inlet chamber 60 formed on the inside of end cap 12.

Inlet chamber 60 of end cap 12 is defined by the outer wall 61 of end cap 12 and an inner wall 62 having a large diameter passage 63 therethrough surrounded on its righthand end by valve seat 64 which valve seat generally has an axis on the central axis of the housing A.

An insert member 70 is mounted in the lefthand end of sleeve 10 and includes a flange 71 having an outer periphery which fits between the end cap 12 and the lefthand end of sleeve 10 and a cylindrical sleeve 72 the inside surface of which defines a cylinder bore 75 in which valve member 76 is slidably supported. The lefthand surface of flange 71 and the righthand surface of flange 62 are shaped to provide a passage or closed valve chamber 77 around valve seat 64. In effect valve C sealingly divides the two chambers when closed.

Insert 70 has a projection 78 having a passage 79 opening to chamber 77 outwardly of valve seat 64. This projection 78 provides a mounting for passage D which is in the form of a helix of tubing 80 with one end brazed into an opening of corresponding size in the projection 78. The opposite end of tube D opens into space 48.

The helix may consist of any number of turns, but in the embodiment shown has six and one half turns and has an axial length substantially the maximum which will fit between the flanges 71 and 17.

Sleeve 45 extends to relatively close spaced relationship with the righthand end of the sleeve 72 to provide a space 80 through which the gases may flow.

Valve C is comprised of the valve seat 64 and a valve member 76 slidably supported in cylinder bore 75. This member is in the shape of a sleeve having an O-ring 83 positioned in a groove in the outer surface which is in sliding sealing engagement with the walls of the cylinder bore 75. The valve member 76 has a flange 84 on its lefthand end which engages the lefthand surface of flange 71 and acts as a stop to restrict the righthand movement of the valve member 76. A washer 85 of synthetic sealing material is mounted on the lefthand end of the valve member 76 and has a diameter such as to sealingly engage the valve seat 64 such that when the valve member 76 is in the lefthand position as shown in the lower part of FIG. 1, communication and flow of gas from the inlet chamber 60 to the passage 79 is prevented.

It will be appreciated that the normal position of the valve member 76 is in the righthand or retracted position such that the valve C is normally open so gases can flow freely from inlet chamber 60 to passage 79 and into the tube D.

As an important feature of the invention, means are provided for latching the valve member 76 in the valve closed position and holding it there with a resilient bias. In the embodiment of the invention shown, such means include a locking member 90 slidably supported in a cylinder bore 91 in the valve member 76. Such locking member 90 has a groove in its outer surface in which a sealing ring 92 is mounted which seals the locking member as it moves back and forth in the valve member bore 91. The lefthand end of locking member 90 has a portion 95 of reduced diameter to form a lefthand facing shoulder 96 against which one end of a helical compression spring 98 bears, the other end of which bears against a shoulder 99 at the lefthand end of the cylinder bore 91. Thus, the locking member 90 is always biased to the right relative to the valve member 76 by the spring 98 and vice versa. A C-ring 100 snapped into a groove in the righthand end of cylinder bore 91 provides a stop limiting the righthand movement of the locking member 90 relative to the valve member 76.

The reduced portion 95 of the locking member 90 extends beyond the lefthand end of the valve member 76 into a cylindrical opening 102 of an insert sleeve 103 threadably supported in the end cap 12. Such opening has an undercut base 104 forming a lefthand facing tapered shoulder 105 for reasons which will appear hereinafter. The locking member 90 has a bore 107 in its lefthand end in which a latching member 110 is movably supported. The latching member has a diameter such as to slidingly fit within the bore 107 and has a pin 112 of reduced diameter extending to the left through an opening in the base of sleeve 103 and through a corresponding opening 113 in the lefthand surface of the end cap 12. An O-ring 111 slidingly seals the pin 112. The juncture of pin 112 with the larger diameter portion of member 110 forms a shoulder 114. This shoulder is preferably at an angle to the length of the pin.

The walls of the sleeve formed by the bore 107 and the reduced portion of locking member 110 have a plurality of transverse openings therethrough in which latches in the form of balls 115 of a slightly smaller diameter are movably supported. The position of held openings is such that when the latching member 110 is in the righthand position, the balls will be engaged by the shoulder 114. Further, the balls within the confines of opening 102 and are held in engagement with the outer surface of pin 112 by the surface of cylinder bore 102. Thus, the latching member 110 is normally locked in the righthand position shown in the upper half of FIG. 1 by the balls engaging the shoulder 114 and being held against radial displacement by the surfaces of cylinder bore 102. In this same position, locking member 95 is helf against ring 100 by spring 98 and the valve member 76 is thus held in the righthand position so that the sealing member 85 is spaced from the valve seat 64.

It will be noted that with this arrangement the valve member 76, the locking member 90 and the latching member 110 are all free to move axially in the cylinder bore 75 as a unit: the only restraint being the friction of the O-ring 83 against the cylinder bore 75 and the friction of the O-ring 111 against the pin 112. No spring is used to bias the assembly of these three units to the right or valve open position. The righthand end of member 76 and locking member 90 are exposed to any gas pressure in passage 46.

In operation, gases under regulated pressure, for example, 10 lbs. per sq. inch flow inwardly through check valve B and move the valve plate 54 away from its valve seat 55 against the force of spring 53. These gases then flow through the spaces 58 of the valve sleeve 50 into inlet chamber 60.

If, by chance, the valve member 76 were in the valve closed position but with the latching pin 110 in the righthand position, the gas pressure on the lefthand end of the valve member would move the valve member to the right thus opening the valve so that gases can flow to the passage 79 and through the helical coil tube 80 into the righthand end of the space 48. These gases then flow lengthwise of the housing through space 48, space 82 into the inside of sleeve 46, thence through the passage 46 and the inside 29 of the sleeve piston 31 and through passage 24 into a hose not shown leading to a torch or other device using the gas.

Spring 44 biases valve member 31 to the right so that its packing 35 is in sealing engagement with the valve seat 23. Inlet gas pressure biases latching pin to the left against balls 115.

In the event of a flash back which as previously indicated is a high pressure wave, usually accompanied by flame which progresses in a direction opposite to the normal flow of gas, the high pressure wave flows into the device through passage 24, the passage 29 and passage 46. This pressure wave would then normally flow outwardly through space 82 longitudinally through space 48 to the open end of the tube 80. This pressure must then flow through the tube 80 to passage 79 and thence would normally flow past the valve seat 64 to valve B. Valve B is incapable of closing fast enough to stop the flash back. However, during the length of time that the gases are flowing the length of space 48 and the length of the helical tube 80, the pressure has had time to cause valve member 76 to move to the left such that the valve washer 85 is in sealing engagement with the valve seat 64. As the valve member 76 moves to the left the locking member 90 and the latching member 110 move therewith. However, when the valve member 76 has reached the limit of its movement, i.e., against valve seat 64, the pressure continues to exert a force on locking member 90 and forces it to the left against the bias of spring 98 as is shown in the lower half of FIG. 1, until the balls 115 have cleared the shoulder 105, at which time the balls 115 are free to move radially outwardly and clear the shoulder 114 on latching member 110. It will be appreciated that because of the clearances, the pressure of the gases in inlet chamber 60 exist in the space to the right of the latching member 110 and these pressures then force the latching member 110 to the left which forces the balls radially outwardly until the shoulder 114 engages the base of bore 103. At this point, pin 112 of latching member 110 projects outwardly beyond the end of the housing as shown at 125.

It is to be particularly noted that the valve member 76 only has to move a very short distance in order to engage valve seat 64 and the length of time required for this movement is less than the length of time for the pressure wave to flow through the passages previously described.

In the valve closed position, the steel balls are held in the radially outward position by the larger diameter portion of latching member 110 and the locking member and latching member cannot move to the right because the balls 115 would engage shoulder 105.

The valve member 76 is thus biased into sealing engagement with the valve seat 64 by spring 98. It will thus be appreciated that the flash back is effectively prevented from flowing past valve C to the source of fuel.

At the same time that the flash back pressure is urging valve member 76 to the closed position, this pressure also exerts a force on the righthand side of valve member 31, which as will be noted has a greater area on its righthand end than on its lefthand end such that this pressure will force the sleeve piston 31 to the left thus opening the valve E and allowing the flash back pressures to be exhausted to the atmosphere through passages 45 and 23.

It will thus be seen that disruptive pressures will not develop in the hoses connecting the device to the torch or otherwise which is using the gas from which the flash back originated.

The operator can readily see that a flash back has occured by virtue of the pin 112 projecting out of the lefthand end of the end cap 12. To reset the device for operation, all the operator must do is to press the pin 112 to the right which causes the head of the latching member 110 to engage the base of cylinder bore 105. As the latching member moves to the right the balls are free to move radially inwardly and away from shoulder 104 such that locking member 90 is then free to move to the right under the bias of spring 98 and against the locking C-ring 100. The valve member 76 will also be forced to the open position by pressing the latching member 110 to the right, although it will be appreciated that in the event that the valve member 76 should not move to the valve open position, that gas pressures in the inlet chamber 60 on the lefthand end of the valve member 80 and the locking member 90 would force the valve to the open position.

Of course, as soon as the flash back pressure has been relieved, the sleeve piston 31 will be forced to the closed position by means of spring 44.

The invention has been described with reference to a preferred embodiment. Obviously modifications and alterations will occur to others upon a reading and understanding of this specification and it is my intention to include all such modifications and alterations insofar as they come within the scope of the appended claims.

Having thus described my invention, I claim:

1. A safety device for automatically interrupting a flash back through a gas supply conduit comprising in combination; a housing, means defining a passageway in said housing having an inlet end and an outlet end, a pressure actuated valve comprising a valve seat surrounding the inlet end of said passageway and a valve member freely slidable in said housing on a line of movement from a first position spaced from said valve seat to a second position sealingly engaging said valve seat, said valve member having a first pressure surface on the end remote from said valve seat exposed to pressures at the outlet end of said passageway and a second pressure surface exposed to pressures at the inlet end of said passageway, a locking member slidably supported in said valve member on said line of movement and having a first position toward said pressure surface and a second position toward said valve seat, said locking member having first pressure surface on the end remote from said valve seat exposed to the pressures at the outlet of said passageway and means biasing said locking member relative to said valve member to said first position.

2. The combination of claim 1 including means coacting with said housing for latching said locking member in said second position when said valve member and locking member are moved to said second position by pressures on said first pressure surfaces.

3. The combination of claim 2 wherein means define a bore to the outside of said housing, and said latching means comprise a latching member movable on said line of movement in the end of said locking member remote from said pressure surface and having a pin extending through said bore to the outside of said housing.

4. The combination of claim 3 wherein said bore has an undercut providing a shoulder facing the outside of said housing, said latching member has a portion of reduced diameter forming a shoulder facing the outside of said housing, transversely movable members carried by said locking member which in the first position engage the shoulder of said locking member and the innerwall of said bore and in the second position engage said shoulder of said housing bore and the outer surface of said latching member and coact with said locking member to prevent movement to its first position.

5. A pressure release valve for a flash back arrestor comprising in combination a housing having a wall, means defining a first outlet passage through said wall, a valve seat surrounding said passage, a valve member slidable in a bore in said housing and means biasing said valve member toward said valve seat, means defining a space outwardly of said valve seat, means defining a second passage through said wall to the outside communicating with said space, said valve member being in the shape of a sleeve defining a passage communicating the inside of the housing with said first passage, the diameter of the valve seat being greater than the inner diameter of said sleeve whereby said sleeve has a pressure surface facing said first passage and excessive pressure in said first passage will force said valve member against the biasing means away from the valve sent to communicate the first passage to said space.

6. A flash back arrestor comprising in combination a housing comprised of an elongated sleeve, first and second closure means respectively closing the ends of said sleeve, first insert member on the inside of said sleeve abutting against the inner surface of said first closure means defining an outlet passage through said first closure means, a first valve seat surrounding said outlet passage, a first valve member slidable in said first closure means, means biasing said first valve member into sealing engagement with said first valve seat, means communicating the outside of said first valve seat externally of said housing, said first valve member being in the form of an open ended sleeve whereby said passageway is communicated to the inside of said housing through the inside of said first valve member, said second closure means having a check valve therein an inlet passage to the inside of said housing surrounded by a second valve seat, a second valve member closure means and having a first surface movable into and out of engagement with said second valve seat, means defining a passageway communicating with the side of said second valve seat remote from said inlet passage to the inside of said housing, said means including an elongated tube in the shape of a helix, said second valve member on the end opposite from its first surface being exposed to the inside of said housing, said second valve member being freely slidable in said housing from a first position spaced from said second valve seat to a second position in sealing engagement with said second valve seat and means for latching said second valve member against said second valve seat when pressures in said housing move said second valve member against said second valve seat.

7. A safety device for automatically interrupting a flash back through a gas supply conduit comprising in combination a housing having an inlet and an outlet chamber means, defining an elongated passageway intercommunicating said chambers, a valve between said inlet chamber and the inlet to said elongated passageway, said valve comprising a valve seat and a valve member freely slidable in sealed relationship with said housing on a line of movement from a normal first position spaced from said valve seat to a second position where a first surface on one end thereof is in sealing engagement with said valve seat, said valve member having a second surface on the opposite end exposed to pressure in said outlet chamber whereby high pressures in said outlet chamber from a flash back will move said valve member from said first position to said second position and latching means biasing said valve member to said second position after said valve member has moved a predetermined distance from said first position to said second position.

8. The combination of claim 7 wherein said latching means comprise a locking member slidable in said valve member on said line of movement and having a first surface on one end facing said inlet chamber and a second surface on the other end facing said outlet chamber whereby high pressures in said outlet chamber from a flash back move said locking member from a first to a second position, means biasing said locking member relative to said valve member towards said first position and means associated with said housing locking said locking member in said second position whenever flash back pressures move said locking member thereto.

9. The combination of claim 8 wherein said locking member has a bore in its first surface and a latching member is slidably mounted in said bore, said latching member having a portion of reduced diameter providing a shoulder and extending through sealing means externally of said housing, said latching member having a first position seated in said bore and retracted in said housing and a second position at least partially removed from said bore and extending outwardly of said housing, said housing having a bore in which the inlet pressure end of said locking member is slidable, said bore having an undercut base providing a shoulder, lateral openings in the walls of the bore of the locking member, locking balls in said lateral openings and in the first position engaging the shoulder of said latching member and the walls of the housing bore to prevent said latching member moving to the latching position, and in the second position said balls moving laterally out of said lateral openings into said undercut when said locking member is moved to the second position, whereby said balls engage the shoulder formed by said undercut and said latching member can move from its first position to a second position holding said balls against said shoulder and locking said locking member in its second position.

10. A housing for a flash back arrestor comprised of a first sleeve, first and second ends closing respective opposite ends of said sleeve, a second sleeve inside said first sleeve extending from said first end toward but spaced from the second end and spaced from the inner wall of said first sleeve and defining therebetween a space, means defining a chamber in said second end, a tube in the shape of a helix in said space having an end communicating with said chamber, the other end of said tube opening to said space and flash pressure actuated valve means movable under flash pressures in said second sleeve to close off the communication between said chamber and said tube.

11. The combination of claim 10 wherein said first end has fastened to one end of said first sleeve and having a first central passage therethrough; a valve seat surrounding said central passage, means defining a second passage communicating the outside of said valve seat to the outside of said housing, a pressure actuated valve member slidable in said first end, means biasing said valve member against said valve seat, said valve member having a pressure surface inwardly of said valve seat facing said first passage and movable under pressures in said first passage to vent same to the outside of said housing.

12. A flash back arrestor comprising in combination an elongated housing having first and second ends, an inlet passage in said first end, a pressure-actuated valve in said passage, an elongated tube in said housing having an inlet passage communicating with the outlet of said pressure-actuated valve and an outlet end communicating with the inside of said housing, said pressure-actuated valve including a piston member having a first valve open and a second valve closed position and having a pair of oppositely facing surfaces, one exposed to pressure at the outlet and the other exposed to pressure at the inlet end of said tube, said piston member being freely movable from said first position to said second position when pressures at the outlet end of said tube exceed pressures at the inlet end of said tube, and means latching said piston member against movement when it has moved to a closed position under such pressure differential.

13. The combination of claim 12 wherein said tube is in the form of a helix and its outlet end is remote from said first end, said helix being positioned adjacent the inner surfaces of said housing, a sleeve member inwardly of said helix and extending from said second end toward but spaced from said first end and means defining an outlet passage in said second end communicating with the inside of said sleeve.

14. The combination of claim 13 wherein said outlet passage is surrounded by a valve seat, a piston, means biasing said piston into sealing engagement with said valve seat and means defining a second outlet passage in said housing communicating with the side of said valve seat remote from said outlet passage, said piston being in the form of a sleeve and defining a passage communicating the outlet passage with said inside of said housing.

15. The combination of claim 12 wherein said latching means include a locking piston slidably supported in said valve piston member from a first unlocked to a second locked position and having first and second pressure surfaces exposed to pressures at the outlet and the inlet end of said tube respectively, means biasing said locking piston towards said first pressure surface of said valve piston member, said locking piston moving a greater distance than said valve piston member under said pressure differentials and means coacting with said housing for latching said locking piston in a fixed position after it has moved a predetermined distance greater than said valve piston member whereby said valve piston member is biased to said closed position.

16. The combination of claim 15 wherein said locking piston has a closed bore in said second surface, a locking pin having one end slidable in said bore and an opposite end of reduced diameter extending through the wall of said housing and having a first shoulder facing away from said locking piston, said wall of said housing having a bore, said locking piston having a portion which is slidable in said bore said bore having an undercut base forming a second shoulder facing opposite to said first shoulder, and laterally movable members carried by said locking piston and held in an innermost position by the wall of said housing bore when said locking piston is in its first position, said first shoulders on said locking pin engaging said members when said locking pin is retracted in said locking piston bore, said locking pin moving said laterally movable members outwardly when said locking piston moves to its second position and said laterally movable members engaging said second shoulder preventing movement of said locking piston to the unlatched position.

* * * * *